Aug. 31, 1954  P. A. NEWMAN  2,687,874
JACK BAR FOR AUTOMOBILES
Filed April 3, 1951
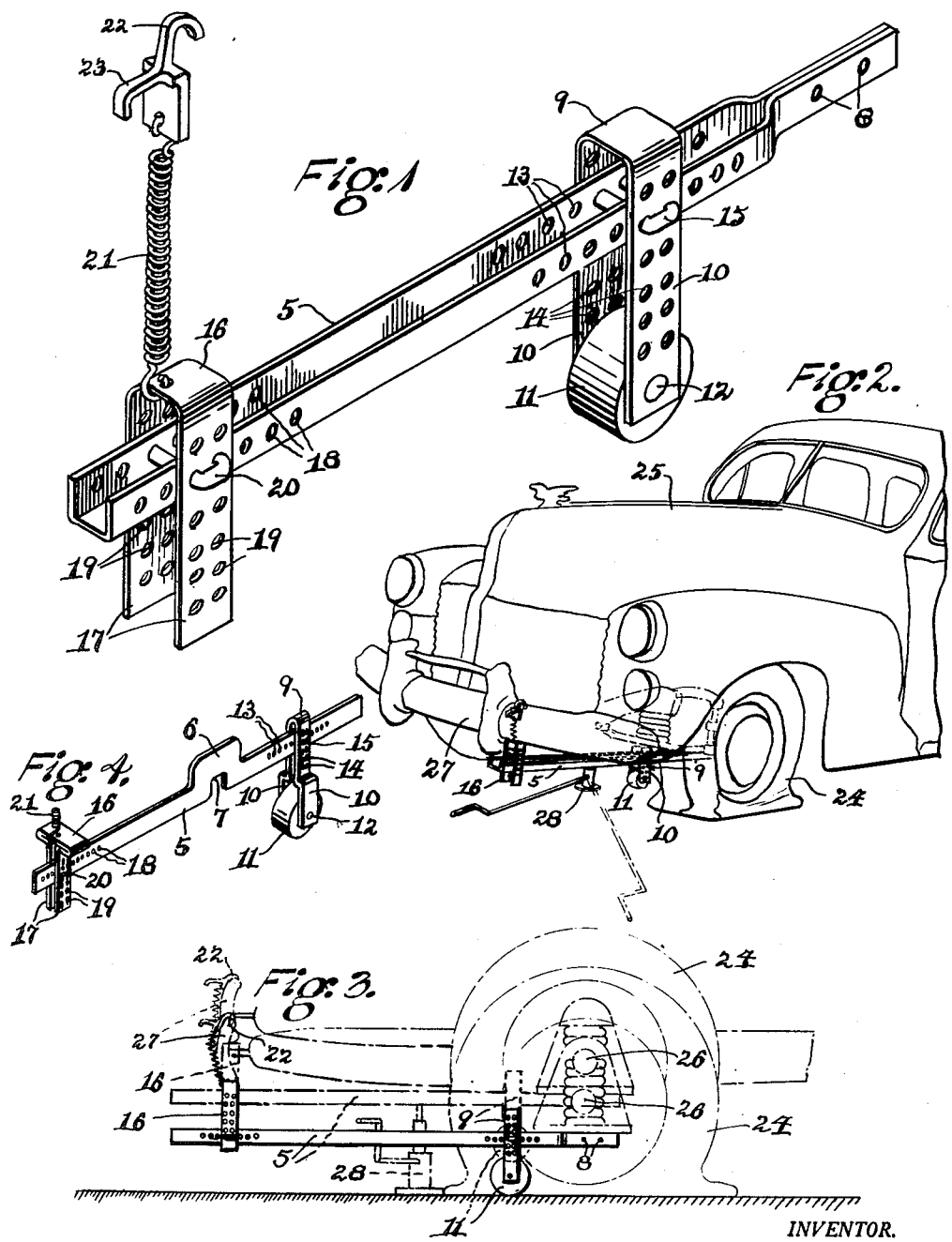
INVENTOR.
Paul A. Newman
BY
W. W. Williamson
ATTORNEY Patented Aug. 31, 1954

2,687,874

UNITED STATES PATENT OFFICE 2,687,874

JACK BAR FOR AUTOMOBILES

Paul A. Newman, Philadelphia, Pa.

Application April 3, 1951, Serial No. 219,001

2 Claims. (Cl. 254—134)

My invention relates to a new and useful jack bar for automobiles and has for one of its objects to produce a relatively inexpensive but strong, durable and efficient item for use with vehicles in general and automobiles in particular to function as a supporting girder engaging two separated points of the vehicle and to be elevated by a suitable lifting jack engaging the bar at only one location intermediate the ends thereof.

Another object of the invention is to produce a jack bar consisting of a bar of metal, wood or other appropriate material, long enough to at least span the distance between a vehicle axle, or other part carrying the springs which support the vehicle body, and the rear or front vehicle bumper, depending on whether a rear or front wheel is to be lifted, said bar being laterally restricted at the forward end to fit into a small space, and a saddle adjustably mounted on the rear end of said bar for adjustment longitudinally of the bar and perpendicularly relative thereto and adapted to engage the underneath edge of a vehicle bumper for supporting the latter.

Another object of this invention is to produce a saddle at one end and a wheeled support at the other end, said wheeled support and saddle both being adjustable longitudinally of the beam and perpendicularly relative thereto, and said beam being of sufficient length to permit the supported end to be rolled under a vehicle axle or other associated part, which is in the region of the axle, and position the saddle for engagement with the lower edge of the vehicle bumper, said beam to be elevated by any suitable lifting jack placed thereunder and resting on a ground surface.

Considerable difficulty and much danger is involved in using a bumper jack, principally because the vehicle's supporting spring must be extended or flexed in the reverse direction to its normal load carrying position to such an extent that the spring will carry, in a dependent condition, the weight of the axle, wheel, spring mounting and other associated items. This necessitates the bumper jack to be raised so high that it becomes a very unstable support. Therefore, another object of the invention is to produce a jack bar that can be utilized, in connection with a suitable relatively low lifting jack, to simultaneously lift the vehicle at the axle and bumper locations and thereby provide an exceedingly stable support for a portion of the vehicle while elevated.

One advantage of using a jack bar, such as herein described, is that the vehicle spring continues to support a portion of the weight of the vehicle chassis and component elements and said spring is not reversely flexed to cause an uneven distribution of the load which, therefore, overcomes many of the possibilities of the vehicle tilting. Also the lifting movement of the lifting jack is considerably reduced and it may be so placed relative to the beam ends that the lever ratio will be such as to cause the vehicle bumper to rise proportionately higher than the axle so the mud guard, especially the rear one, will clear the wheel and tire to permit substantially unobstructed removal of the latter.

Another object of the invention is to provide means for temporarily holding the saddle in engagement with the lower edge of a bumper under yielding pressure.

A further object of the invention is to produce a jack bar which may be readily and easily placed beneath a vehicle between its axle and/or associated parts and a bumper to provide an extended jack engaging area beneath which a lifting jack can be projected from the side of the vehicle with an opportunity of ascertaining the placement of the lifting jack and the use of a relatively short jack operating handle.

A still further object of this invention is to provide the jack bar beam with an upwardly extending off-set for the reception of the head of a lifting jack whereby the latter can be accommodated even though the distance between the vehicle axle and/or bumper and the ground surface, especially when a tire is deflated, is very short.

With the above and other objects in view this invention consists of the details of construction and combination of elements hereinafter set forth and then designated by the claims.

In order that those skilled in the art to which this invention appertains may understand how to make and use the same I will describe its construction in detail referring by numerals to the accompanying drawing forming a part hereof, in which:

Fig. 1 is a perspective view of a jack bar constructed in accordance with the invention.

Fig. 2 is a view, in perspective, of the front end of an automobile illustrating how the jack bar can be projected beneath the automobile with a deflated tire and a lifting jack associated therewith from the side and utilized to elevate a portion of said automobile.

Fig. 3 is a side view of the jack bar and illustrating it in connection with parts of an automobile having a deflated tire and a lifting jack, depicted in broken lines, and also showing one other position, in broken lines, when the jack bar is elevated to some extent.

Fig. 4 is a perspective view of a modification, particularly to illustrate an upwardly extending off-set portion intermediate the ends of the beam.

In carrying out my invention as herein embodied 5 represents the beam of the jack bar which may be of any suitable or desirable cross section such as a U channel shown in Fig. 1 or a solid section as depicted in Fig. 4 and said beam, of whatever cross sectional shape, may be straight from end to end, Fig. 1, or may have an upwardly extending off-set portion 6 intermediate its ends, Fig. 4, to provide an elevated jack engaging surface 7 above the underneath surface of the beam as a whole.

The beam of Fig. 1 is restricted at its forward end, so called because it is this end that is first projected beneath the automobile when the jack bar is used, by cutting away or otherwise eliminating a short portion of the web of the channel and bending the flanges inwardly until they engage each other in the longitudinal axis of the beam. The contacting flanges are secured together in any well known manner as by rivets 8, and thus provide a thin or narrow forward end for projection into a small space where only such is available.

On the forward end of the beam, adjacent the terminal thereof, is mounted an inverted U-shaped member 9 with the legs 10 thereof, preferably, straddling said beam and positioned in a pendant condition. Between the lower ends of the legs of the inverted U-shaped member is located a wheel or roller 11 journalled on an axle 12 having its ends fixed in said legs.

The inverted U-shaped member is adjustable longitudinally of and perpendicular to the beam 5 and for this purpose I have shown a series of holes 13 running transversely through the beam and spaced longitudinally thereof, as well as sets of holes 14 through the legs of the inverted U-shaped member 9 and spaced longitudinally of said legs. When any of the holes 14 are in alignment with any of the holes 13 a fastener 15 can be projected therethrough to temporarily hold the inverted U-shaped member 9 in the desired adjusted position. I have shown the fastener 15 as a U-bolt only for purposes of illustration since many equivalent means may be employed to accomplish the same result but the means should hold the inverted U-shaped member in a manner to prevent tilting thereof and since the U-bolt fastener has two legs the holes 14 in the fork are arranged in pairs.

On the rear end of the beam 5 is mounted a saddle 16, which may be an inverted U-shaped item with the legs 17, preferably, straddling said beam and adjustable longitudinally of and perpendicular to said beam. This saddle 16 may be adjustably connected to the beam in the same manner as the inverted U-shaped member 9, wherefore a series of holes 18 are shown running transversely through said beam at the rear end thereof and spaced longitudinally of the same. Also sets of holes 19 are provided in the saddle and are formed in the legs 17 thereof and spaced longitudinally of said legs. After adjusting the saddle longitudinally of the beam and perpendicularly relative thereto with some of the holes 19 in alignment with some of the holes 18 a fastener 20 is projected through the aligned holes to temporarily retain the saddle in its adjusted location and position.

The upper end portion of the saddle constitutes a seat to engage the lower edge of a vehicle bumper and in order to provide a wide contact surface an upper panel may be extended beyond the outer flat faces of the legs, Fig. 4, and the ends of said panel bent back thereunder towards but short of each other where they are bent downwardly in spaced parallel relation to form the legs 17.

In order to yieldingly retain the saddle in engagement with a vehicle bumper, one end of a coil spring 21 is attached to the upper end of said saddle and on the opposite end of the spring is a hook 22 and said hook may be so constructed as to provide a handhold 23 whereby the spring may be easily stretched and the hook engaged with the upper edge of the vehicle bumper.

The type of vehicle with which the jack bar can most advantageously be employed usually has a long rear overhanging portion and, generally, is fitted with a luggage compartment large enough to accommodate the full length of said jack bar although it will be apparent that the beam can be made of two or more sections slidably or hingedly connected to be collapsed into a small parcel. Because of the above mentioned long rear overhanging portion of the vehicle body it is exceedingly difficult to properly place a lifting jack under a rear axle from the rear of the vehicle and practically impossible to carry out such operations from the side of the vehicle or to see under the vehicle in the locality where it is desired to place the lifting jack. These difficulties are overcome by the use of the present jack bar because it can be readily placed beneath the vehicle and so positioned that a portion thereof will be easily accessible from the side of the vehicle.

The saddle, in particular, provides for positioning the beam in spaced relation to parts of the vehicle underneath of the same between the axle and bumper, especially the muffler pipe and gasoline tank. After the saddle has been adjusted to proper position for the vehicle with which it is to be used said saddle need not be disturbed but left permanently fastened in place on the beam. Likewise the inverted U-shaped member 9 may be adjusted on the beam and permitted to remain unless it is to be used in another place.

In practice, in the event of a deflated tire 24, due to a puncture, blow-out or from any other cause, the jack bar is rolled under the vehicle 25, forward end first, until the forward end of the beam is disposed beneath the axle 26 or spring mounting, and therefore close to a side of the vehicle, with the rear end of said beam protruding beyond the bumper 27 and, if not already properly positioned, the saddle 16 is adjusted along the beam so as to be disposed beneath said bumper. The perpendicular adjustment of the saddle relative to the beam will cause said saddle to engage the lower edge of the bumper when the hook 22 is placed over the upper edge of said bumper and the beam will be in a substantially horizontal or any angular position desired.

Under these conditions the jack bar is practically stable and substantially fixed whereupon a lifting jack 28 of any suitable type may be projected beneath the jack bar beam at any appropriate location between the ends of said beam, preferably adjacent the vehicle axle, to obtain the desired ratio of elevation between the forward and rear ends of said beam and to be near the center of the load.

The placing of the lifting jack can be accomplished from the side of the vehicle and, in most instances, the location of the lifting jack will be in full view of the operator and only a very short operating handle will be required. The placement of the lifting jack under the beam may be such that during the lifting operations the bumper will be elevated more than the axle or spring support and thus raise the mud guard or fender high enough to clear the wheel or tire to permit easy removal of the latter or both.

Where the vehicle is of the low hung type so that the underneath and even the lowest or shortest lifting jacks cannot be placed under the straight beam of the jack bar, said beam is provided with the offset 6 thus providing a lifting jack engaging surface which is higher than the balance of the underneath surface of said beam and a lifting jack then can be properly positioned under the beam.

Of course I do not wish to be limited to the exact details of construction herein shown and described as these may be varied within the scope of the appended claims without departing from the spirit of my invention.

Having described my invention what I claim as new and useful is:

1. The combination with a vehicle having an axle and a bumper adjacent said axle, both at one end of the vehicle, a jack bar comprising a beam of a length to span the distance between said axle and bumper underneath of the same and to be projected endwise beneath the vehicle, a wheel supporting means mounted on the end of the beam which is projected under the axle and adjustable longitudinally of and perpendicular to said beam, means to hold said wheel supporting means in any adjusted position, a wheel mounted on the wheel supporting means below the beam, an inverted U-shaped saddle mounted on the opposite end of the beam and adjustable longitudinally of and perpendicular to said beam above the same, means to hold said saddle in any adjusted position, said saddle engaging the under side of the bumper, and means to yieldingly hold the saddle in engagement with said bumper comprising a coil spring having one end attached to said saddle, a hook on the other end of said spring and engaging the upper edge of the bumper and a handhold on said hook for manipulating the latter, said beam to function as a lifting stringer for a separate and independent lifting jack placed under the beam from the side of the vehicle.

2. A jack bar for automobiles comprising a channel beam with the open side uppermost and of a length to bridge the space between an automobile bumper and an adjacent axle, an inverted U-shaped member straddling said beam adjacent one end thereof and slidable longitudinally of and vertically relative to the beam for adjustment purposes, means to hold said inverted U-shaped member in any adjusted position, a wheel journalled in the lower end of said inverted U-shaped member below the beam, a saddle of inverted U-shape formation straddling the other end of said beam and slidable longitudinally of and vertically relative to said beam for adjustment purposes, means to hold said saddle in any adjusted position while in engagement with the bumper, and spring actuated means to temporarily yieldingly hold the saddle in engagement with said bumper, the bight of the channel beam being engageable by a jack for lifting the automobile.

References Cited in the file of this patent
UNITED STATES PATENTS

| Number | Name | Date |
|---|---|---|
| 1,326,670 | Korzagadarian | Dec. 30, 1919 |
| 2,046,657 | Schultz | July 7, 1936 |
| 2,050,130 | Schupbach | Aug. 4, 1936 |
| 2,207,443 | Schneider | July 9, 1940 |
| 2,604,299 | White | July 22, 1952 |